United States Patent
Powell

(10) Patent No.: US 9,417,839 B1
(45) Date of Patent: Aug. 16, 2016

(54) FLOATING POINT MULTIPLY-ADD-SUBSTRACT IMPLEMENTATION

(71) Applicant: Makia S Powell, North Dighton, MA (US)

(72) Inventor: Makia S Powell, North Dighton, MA (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 183 days.

(21) Appl. No.: 14/535,384

(22) Filed: Nov. 7, 2014

(51) Int. Cl.
  *G06F 7/483* (2006.01)
  *G06F 7/499* (2006.01)
  *G06F 5/01* (2006.01)

(52) U.S. Cl.
  CPC ................ *G06F 5/012* (2013.01); *G06F 7/483* (2013.01); *G06F 7/49905* (2013.01)

(58) Field of Classification Search
  CPC ............................... G06F 7/483; G06F 7/4991
  See application file for complete search history.

(56) References Cited

U.S. PATENT DOCUMENTS

| | | | | |
|---|---|---|---|---|
| 4,639,886 A * | 1/1987 | Hashimoto | ............... | G06F 7/48 708/518 |
| 4,974,198 A * | 11/1990 | Ishii | ................... | G06F 15/8076 708/520 |
| 5,339,266 A * | 8/1994 | Hinds | ..................... | G06F 7/483 708/495 |
| 5,931,895 A * | 8/1999 | Yamada | .................. | G06F 5/012 708/205 |
| 6,516,332 B1 * | 2/2003 | Carter | ..................... | G06F 7/026 708/495 |

* cited by examiner

*Primary Examiner* — Chuong D Ngo
(74) *Attorney, Agent, or Firm* — James M. Kasischke; Michael P. Stanley

(57) ABSTRACT

A floating point multiply and addition/subtraction implementation is provided. Two operands are received in a standard floating point format with a code selecting a mathematic operation from addition, subtraction, and multiplication. Result mantissas and exponents are calculated simultaneously for all operations. The implementation simplifies computation of a result mantissa by dropping the least significant bits of the operands before computing the result. Underflow and overflow errors are shown by two extra bits in the exponent portion of the result. The mantissa result and the exponent result are selected by providing the operation code to a mantissa multiplexer and an exponent multiplexer. The selected mantissa and exponent are combined as output.

4 Claims, 2 Drawing Sheets

US 9,417,839 B1

FLOATING POINT MULTIPLY-ADD-SUBSTRACT IMPLEMENTATION

STATEMENT OF GOVERNMENT INTEREST

The invention described herein may be manufactured and used by or for the Government of the United States of America for governmental purposes without the payment of any royalties thereon or therefor.

CROSS REFERENCE TO OTHER PATENT APPLICATIONS

None.

BACKGROUND OF THE INVENTION (1) Field of the Invention

The present invention is directed to an implementation of a floating point multiply-add-subtract implementation for digital circuitry.

(2) Description of the Prior Art

In digital computer processing, signed floating point numbers can be utilized in a form having a mantissa multiplied by a base having an exponent. Mathematical functions are carried out on these numbers in semiconductor floating point units or processors in binary format. The floating point unit does addition, subtraction, multiplication, and division operations on floating point numbers. In many implementations the exponent is usually biased which means that a number called the bias is subtracted from the written exponent before computation. This allows implementations to use a positive representation of a negative exponent, since the written exponent minus the bias is negative. The examples assume a normalized format, which means that the first bit of the mantissa is '1'.

The Institute of Electrical and Electronics Engineers (IEEE) has standards for floating point representation of numbers. The current standard used by most commercial processors is IEEE-754-2008. The output of this format is a binary floating point number that contains a sign, biased exponent, and mantissa. A 16-bit IEEE-754 floating point number is given by the following format:

seee eemm mmmm mmmm where each letter represents a binary digit or bit; s is the sign bit; each e is an exponent bit; and each m is a mantissa bit. In this format the minimum exponent is −14, and the maximum exponent is 15. The exponent bias is 15. This means that 15 is subtracted from the exponent value to give the actual value. An exponent value having all is 1s used to represent infinity or "not a number" known as NaN. An exponent value having all zeroes is used to represent a denormalized number. IEEE-754 32 bit, 64 bit, and 128 bit floating point formats are similar.

Important resources for floating point unit implementation are its size and its speed. The size of the implementation is the number of gates that are required. Typical commercial 32 bit multiply/accumulate floating point units without division take approximately 12,800 gates. This commercial implementation runs at 1 MFlop/Mhz or 55 Mhz.

When utilizing field programmable gate arrays and other special purpose semiconductors, it is often desirable to reduce the number of gates and chip resources required for processing floating point numbers. It is further desirable to process these numbers as quickly as possible.

SUMMARY OF THE INVENTION

The first object of the present invention is to provide an implementation of a floating point unit utilizing fewer gates.

Another object is to provide an implementation of a floating point unit capable of operating at faster speeds than existing units.

Accordingly, there is provided a floating point multiply and addition/subtraction implementation. Two operands are received in a standard floating point format with a code selecting a mathematic operation from addition, subtraction, and multiplication. Result mantissas and exponents are calculated simultaneously for all operations. The implementation simplifies computation of a result mantissa by dropping the least significant bits of the operands before computing the result. Underflow and overflow errors are shown by two extra bits in the exponent portion of the result. The mantissa result and the exponent result are selected by providing the operation code to a mantissa multiplexer and an exponent multiplexer. The selected mantissa and exponent are combined as output.

BRIEF DESCRIPTION OF THE DRAWINGS

Reference is made to the accompanying drawings in which are shown an illustrative embodiment of the invention, wherein corresponding reference characters indicate corresponding parts, and wherein.

DETAILED DESCRIPTION OF THE INVENTION

The benefits of the floating point unit implementation contained herein are accomplished via pipelining, simplification of exception handling and other hardware techniques. The current implementation calculates NaN, underflow, and overflow exception conditions by calculating the exponent with two additional bits of precision and using signed two's complement binary format. This eliminates complex error/exception detection circuitry because in this format, either of the two most significant bits of the exponent will only be 1 when an exception occurs. Underflow occurs when the most significant bit is 1 because the exponent is negative. Overflow occurs when the two most significant bits are 01 because the exponent portion has exceeded its range. NaN is indicated when the exponent bits following the two most significant bits are all 1's, and the mantissa is non-zero. In the current implementation, post calculation detection of this condition is unnecessary.

The floating point unit implementation receives two floating point numbers $A_{in}$ and $B_{in}$. The floating point number is separated into component parts for processing. For this purpose, in FIG. 2 the mantissa of $A_{in}$ is identified as $A_{man}$, and the mantissa of $B_{in}$ is identified as $B_{man}$. The exponent of $A_{in}$ is identified as $A_{exp}$, and the exponent of $B_{in}$ is identified as $B_{exp}$. The sign of each number is identified as $A_{sgn}$ and $B_{sgn}$. This can be performed by segregating the appropriate bits.

Figure 1:
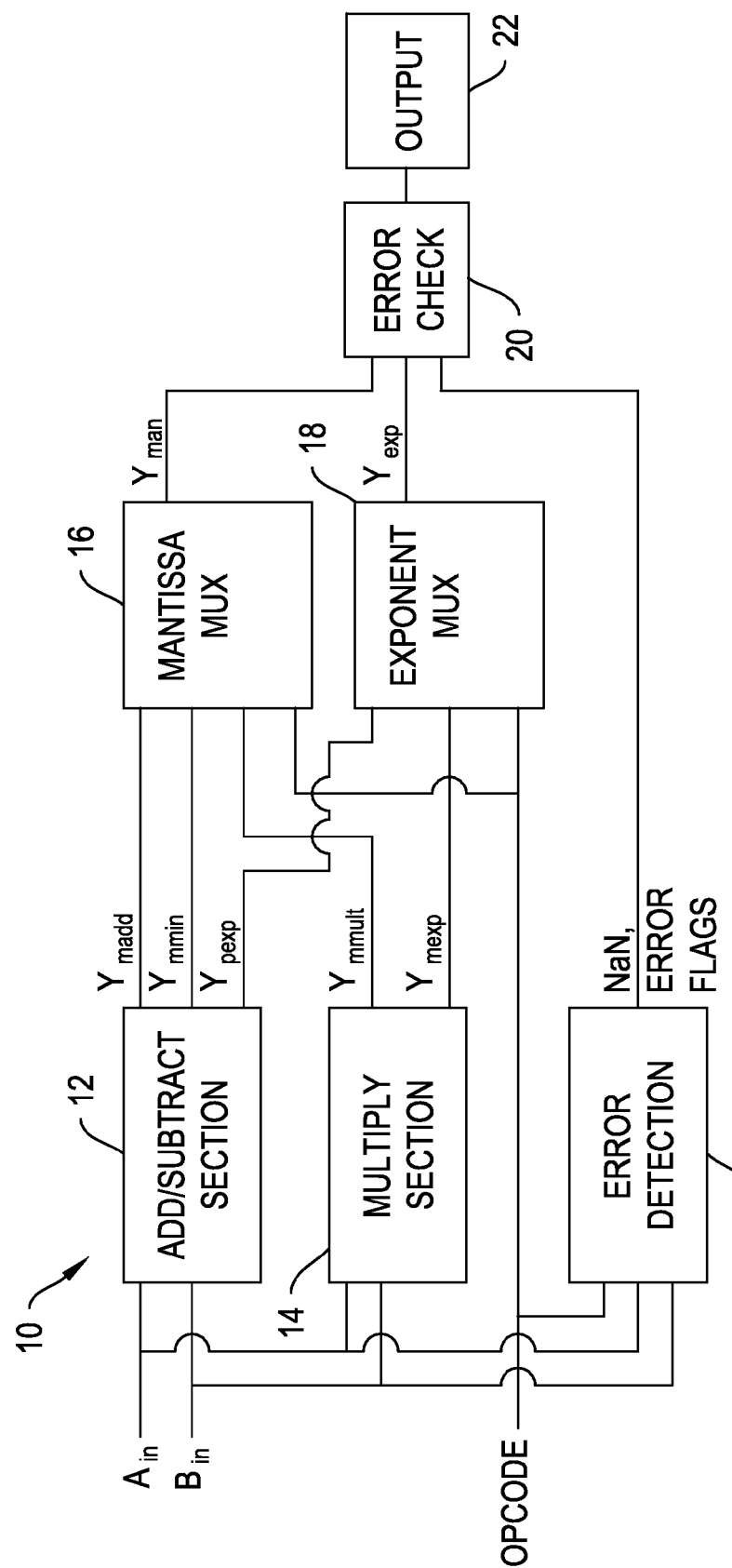
FIG. 1 is a diagram of an overview of the implementation.

FIG. 1 gives an overview of the floating point unit implementation 10. The floating point unit implementation 10 receives $A_{in}$ and $B_{in}$ in a floating point format that can be broken up into signs, mantissas, and exponents. These numbers are provided to an initial error detection module 11, an add/subtract section 12 and a multiply section 14. The user also provides an opcode that selects the operation—multiplication, addition, or subtraction—of the floating point unit implementation 10.

Prior to computation, error detection module 11 checks for NaNs at the inputs by checking if the exponent of either operand, $A_{in}$ or $B_{in}$, is all 1s, and its mantissa is non-zero. (This can be performed by conducting an AND operation among all of the exponent bits of the operand, conducting an OR operation among all of the mantissa bits of the operand, and executing an AND between the two results.) Error detection module 11 then asserts signal $A_{NaN}$ if $A_{in}$ is NaN, $B_{NaN}$ if $B_{in}$ is NaN, and a signal NaN if either $A_{in}$, $B_{in}$, or both is NaN. Next error detection module 11 checks for zeroes at the inputs, and then asserts $A_{zero}$ if both $A_{exp}$ is negated and $A_{man}$ is zero. Likewise, $B_{zero}$ is asserted if $B_{exp}$ is negated and $B_{man}$ is zero. Error detection module 11 then checks for infinities at the inputs and asserts $A_{inf}$ if $A_{exp}$ is all asserted while $A_{man}$ is all negated. $B_{inf}$ is asserted if $B_{exp}$ is all asserted, and $B_{man}$ is all negated. Next, error detection module 11 checks for signaling NaNs at the inputs, and $A_{sNaN}$ is asserted when both $A_{NaN}$ is asserted and the most significant bit of $A_{man}$ is negated. Similarly, $B_{sNaN}$ is asserted when $B_{NaN}$ is asserted and the most significant bit of $B_{man}$ is negated.

Next, error detection module 11 checks if invalid operation exceptions/signaling NaNs exist at the inputs based upon the opcode. If the opcode indicates addition an invalid operations flag, InvOp, is asserted when $A_{sNaN}$ is asserted, or $B_{sNaN}$ is asserted, or both $A_{inf}$ and $B_{inf}$ are asserted and $A_{sgn}$ and $B_{sgn}$ differ. If the opcode indicates subtraction then InvOp is asserted when $A_{sNaN}$ is asserted, or $B_{sNaN}$ is asserted, or both $A_{inf}$ and $B_{inf}$ are asserted and $A_{sgn}$ and $B_{sgn}$ match. If the opcode indicates multiplication then InvOp is asserted when $A_{sNaN}$ is asserted, or $B_{sNaN}$ is asserted, or both $A_{inf}$ and $B_{zero}$ are asserted and NaN is negated, or both $A_{zero}$ and $B_{inf}$ are asserted and NaN is negated. Next error correction module 11 modifies the diagnostic mantissa output, $Y_{NaN}$, to indicate invalid operations and NaN error conditions. $Y_{NaN}$ is set to $A_{man}$ if A is a NaN, that is if either $A_{NaN}$ or $A_{sNaN}$ is asserted. $Y_{NaN}$ is set to $B_{man}$ if B is a NaN. If both A and B are NaNs, $Y_{NaN}$ is set to $A_{man}$. The first bit of $Y_{NaN}$ can be use to indicate a signaling NaN versus a quiet NaN under the IEEE standard.

Further details of the add/subtract section 12 will be given in reference to FIG. 2, and further details of the multiply section 14 will be given in reference to FIG. 3. The mantissa outputs of the add/subtract section 12, $Y_{madd}$ and $Y_{mmin}$, and the multiply section 14, $Y_{mmult}$, are provided to a mantissa multiplexer 16. The opcode is further provided to the mantissa multiplexer 16 to select the correct mantissa function input as the mantissa output, $Y_{man}$. The exponent outputs of the add/subtract section 12, $Y_{pexp}$, and the multiply section 14, $Y_{mexp}$, are provided to an exponent multiplexer 18. The opcode is further provided to the exponent multiplexer 18 to select the correct exponent function input as the exponent result output, $Y_{exp}$. An error check module 20 receives the exponent result output $Y_{exp}$, and $Y_{man}$, the input operands $A_{in}$ and $B_{in}$ and NaN output from error detection module 11. Error check module 20 both computes the diagnostic error output and corrects the exponent and mantissa result outputs for the output format as described hereinafter. The mantissa output $Y_{man}$ and the exponent output $Y_{exp}$ are combined in at an output 22 to give the preferred output form. The diagnostic error output of error check module 20 can be a bus which contains the InvOp, overflow, underflow, and inexact error flag signals from error detection module 11 and error check module 20. A divide by zero flag can be included for compatibility, but this flag will never be asserted. In an alternative embodiment, error check module 20 can give a diagnostic code that can be used to give these flags.

Figure 2:
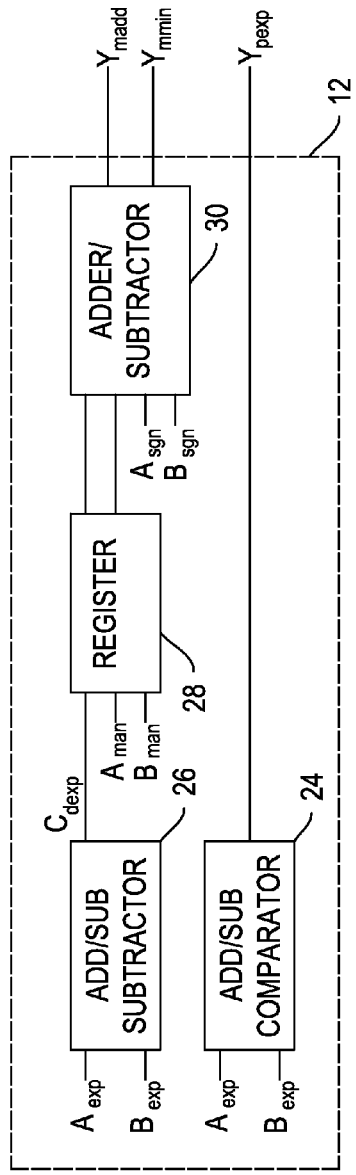
FIG. 2 is a detailed diagram of the add/subtract section of the implementation.

FIG. 2 provides a detailed view of add/subtract section 12. Add/subtract section 12 includes an exponent comparator 24 and an exponent subtractor 26. Exponent comparator 24 receives the exponent component of the inputs, $A_{exp}$ and $B_{exp}$, and provides the larger of the two exponents as the preliminary add/subtract result exponent, $Y_{pexp}$. Exponent subtractor 26 receives the exponent inputs, $A_{exp}$ and $B_{exp}$, and provides the difference between them, $C_{dexp}$, for use in scaling the values. Register 28 receives exponent difference, $C_{dexp}$, and the mantissa inputs, $A_{man}$ and $B_{man}$, and scales these inputs relative to one another. An adder/subtractor 30 receives the scaled mantissa inputs and provides addition results $Y_{madd}$ and subtraction results $Y_{mmin}$ for these inputs.

Figure 3:
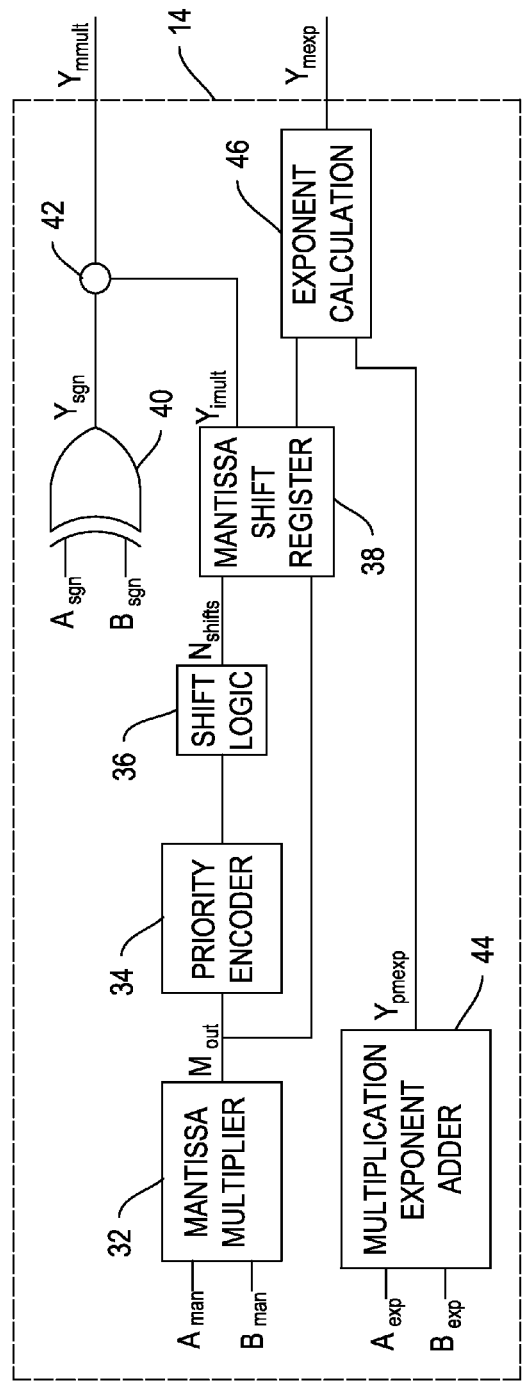
FIG. 3 is a detailed diagram of the multiply section of the implementation.

FIG. 3 provides a detailed view of multiply section 14. A mantissa multiplier 32 receives mantissa inputs $A_{man}$ and $B_{man}$ and provides a multiplied mantissa output $M_{out}$. The multiplied mantissa output, $M_{out}$, is provided to a priority encoder 34 which determines the maximum place value of the mantissa output $M_{out}$. This maximum place value is provided to shift logic 36 which provides a number of shifts $N_{shift}$, for the mantissa to fit into the places allocated for the format. A mantissa shift register 38 receives the mantissa output, $M_{out}$, and the number of shifts, $N_{shifts}$. Shift register 38 shifts the mantissa output by dropping the least significant bits of the mantissa output until the mantissa is the same length in bits as the mantissa portion of the format. Shift register 38 provides an unsigned multiplication result $Y_{imult}$. Shift register 38 also provides an exponent correction that will be used as described below.

In order to calculate the sign of the output, an XOR gate receives the sign bits of the inputs, $A_{sgn}$ and $B_{sgn}$, and provides the sign of the result $Y_{sgn}$ as the exclusive or of the sign inputs. The sign of the result $Y_{sgn}$ is combined in a combiner 42 with the unsigned mantissa multiplication result $Y_{imult}$ to give $Y_{mmult}$.

A preliminary multiplication exponent result, $Y_{pmexp}$, is calculated from the input exponents, $A_{exp}$ and $B_{exp}$, in a multiplication exponent adder 44. Exponent calculation logic 46 receives the preliminary multiplication exponent result, $Y_{pmexp}$, and combines this with the exponent correction from the mantissa shift register 38 to give a multiplication exponent result, $Y_{mexp}$.

Overall operation of the floating point unit implementation is described in the following text.

Mantissa multiplier 32 calculates the mantissa of $A_{man}*B_{man}$ and provides the product, $M_{out}$, with sufficient precision to store the entire result. This could be the place number precision of $A_{man}$ added to the place number precision of $B_{man}$, or double the precision of $A_{man}$ or $B_{man}$ if both have the same precision. Of course a lower precision result may be acceptable for some applications. This product, $M_{out}$, will be shifted in operations in a later stage to drop the least significant digits.

A preliminary result exponent, $Y_{pmexp}$, is determined by adding $A_{exp}$ to $B_{exp}$ in multiplication exponent adder 44. Multiplication exponent adder 44 utilizes two extra bits in the most significant places in these exponent calculations. For example, in IEEE 764 16 bit, the exponents and results would each be five bit values; however, in this implementation, the result is a seven bit value. These extra, most significant bits will only be asserted in cases of underflow and overflow. This will be explained below.

The sign of the final output is determined by executing an "exclusive or" or XOR operation on $A_{sgn}$ and $B_{sgn}$ to give $Y_{sgn}$. This allows use of a simple XOR 40 gate to give the sign for multiplication.

The priority encoder 34 is used to get the order of the multiplication result $M_{out}$ from the mantissa multiplier 32. The order is the position of the most significant bit of $M_{out}$. (For example, if 0100 (4)*0011 (3)=1100 (12) the binary order would be 4 because the most significant digit 1xxx is in the fourth position.) This is used to determine the number of right shifts of $M_{out}$ that will be required for the product to fit in the floating point format. (In 16 bit implementations, 10 bits are allowed. In 8 bit implementations, 4 bits are allowed.) In a preferred embodiment the priority encoder 34 with shift logic 36 determines the order of the bits beyond the number of bits allowed. This can be used directly as the number of shifts, $N_{shifts}$. In an alternate embodiment the order is the absolute order of the product, and this order is converted into a number of shifts, $N_{shifts}$. There are no shifts if the order is less than number of bits allowed. If the order is greater than the number of bits allowed, the number of shifts is an adjustment calculated as the order minus the number of bits allowed.

The product of $A_{man}$ and $B_{man}$, $M_{out}$, is shifted by $N_{shifts}$ in mantissa shift register 38 so that it fits into the number of bits allowed by dropping the least significant digits. This gives $Y_{mmulti}$, the mantissa of the multiplication result. The multiplication exponent $Y_{mexp}$ is calculated in an exponent calculation component 46 by adding the preliminary result exponent $Y_{pmexp}$ to the number of shifts required for the mantissa $N_{shifts}$.

The addition/subtraction process is more fully described below. $A_{exp}$ and $B_{exp}$ are compared using exponent comparator 24 to give the greater of the two exponents as a preliminary addition/subtraction result exponent, $Y_{pexp}$. The difference between $A_{exp}$ and $B_{exp}$ is calculated by exponent subtractor 26, by for example, subtracting $B_{exp}$ from $A_{exp}$ as $C_{dexp}$ using two's complement addition. Two's complement addition uses less complicated logic to manage the signs and give a difference. $A_{man}$ and $B_{man}$ are scaled in register 28 by shifting the mantissa of the operand having the lower exponent. This shift uses the exponent difference $C_{dexp}$ to shift the mantissa's bits to less significant places. The operand being shifted is governed by the sign of the difference, $C_{dexp}$. (One of ordinary skill in the art would understand this as "right shifting" the mantissa.) For example if $C_{dexp}$ is positive this means that $A_{exp}$ is greater than $B_{exp}$ and $B_{man}$ is shifted by $C_{dexp}$ positions. If $C_{dexp}$ is negative $B_{exp}$ is less than $A_{exp}$, and $A_{man}$ is shifted by $C_{dexp}$ positions. This shift truncates the least significant digits of the smaller operand if one operand is significantly smaller than the other. The register 28 also aligns the mantissas prior to addition so that when the operand and the shifted operand are added the bits will be in the appropriate place value.

The register 28 adds an extra bit of precision to $A_{man}$ and $B_{man}$ which have been shifted as described above. A combined adder/subtractor receives the shifted mantissa $A_{man}$ and $B_{man}$ having the extra exponent bit. The adder/subtractor converts these numbers to signed two's complement format by taking the complement of each number and adding one to the complement of each number if the sign bit is 1. While two's complement addition requires the extra bit of precision, it greatly simplifies addition and subtraction because the sign can be ignored. The adder/subtractor 30 calculates an addition result $A_{man}+B_{man}$ to give the mantissa of the addition result, $Y_{madd}$ and a subtraction result $A_{man}-B_{man}$ to give the mantissa of the subtraction result, $Y_{mmin}$. $Y_{madd}$ and $Y_{mmin}$ are then converted by adder/subtractor 30 from two's complement form to signed magnitude form of the result mantissas.

Error check module 20 checks the two most significant bits of $Y_{exp}$ to determine if an error condition such as an underflow/overflow, inexact or NaN condition exists. If the opcode indicates addition and $A_{sgn}$ and $B_{sgn}$ differ or the second-most most significant bit of $Y_{exp}$ is asserted and the $A_{inf}$ OR $B_{inf}$ inputs from error detection module 11 are asserted then $Y_{exp}$ is all asserted. Else, if the opcode indicates addition and the $A_{zero}$ or $B_{zero}$ inputs from error detection module 11 are asserted, or the most significant bit of $Y_{exp}$ is asserted, then $Y_{exp}$ changed to all negated. If the opcode indicates subtraction and $A_{sgn}$ and $B_{sgn}$ match and the $A_{inf}$ OR $B_{inf}$ inputs from error detection module 11 are asserted, or the NaN or InvOp inputs from error detection module 11 is asserted, or the second-most most significant bit of $Y_{exp}$ is asserted then $Y_{exp}$ is all asserted. Else, if the opcode indicates subtraction and the $A_{zero}$ or $B_{zero}$ inputs from error detection module 11 are asserted, or the most significant bit of $Y_{exp}$ is asserted, or the NaN or InvOp inputs from error detection module 11 is asserted, then $Y_{exp}$ changed to all negated. If the opcode indicates multiplication and the NaN or InvOp inputs from error detection module 11 are asserted, or the $A_{inf}$ or $B_{inf}$ inputs from error detection module 11 are asserted and the second most significant bit of $Y_{exp}$ is negated, then $Y_{exp}$ is changed to all asserted. Else, if the opcode indicates multiplication and the $A_{zero}$ or $B_{zero}$ inputs from error detection module 11 are asserted, or the most significant bit of $Y_{exp}$ is asserted, then $Y_{exp}$ changed to all negated the IEEE 754 convention for indicating these conditions. If the InvOp or NaN inputs from error detection module 11 are asserted, then $Y_{man}$ is set to the $Y_{NaN}$ input from error detection module 11. Else, if either of the first two most significant bits of $Y_{exp}$ are all asserted, or the remaining bits after the first two most significant bits of $Y_{exp}$ are all asserted, or all bits of $Y_{exp}$ are negated, then $Y_{man}$ is set to all negated, the IEEE 754 convention for indicating these conditions. If all remaining bits after the most significant bit of $Y_{exp}$ are asserted, and both NaN and InvOp inputs from error detection module 11 are negated then overflow is asserted. Otherwise, if all remaining bits after the most significant bit of $Y_{exp}$ are negated, and both NaN and InvOp inputs from error detection module 11 are negated then underflow is asserted. If the $A_{zero}$ input from error detection module 11 is asserted and $A_{man}$ is not all negated, or the $B_{zero}$ input from error detection module 11 is asserted and $B_{man}$ is not all negated, then the inexact output is asserted, the IEEE 754 convention for indicating these conditions. The diagnostic error output of error check module 20 is a bus which contains the InvOp, overflow, underflow, and inexact output signals from error check module 20. Bus can include a divide by zero line for compatibility, but this line will never be asserted because this implementation lacks a divide module.

A mantissa multiplexer selects among $Y_{mmin}$, $Y_{madd}$ and $Y_{mmult}$ based on the opcode to provide the result mantissa $Y_{man}$. $Y_{mmin}$ is selected if the opcode indicates subtraction, $Y_{madd}$ is selected if the opcode indicates addition, and $Y_{mmult}$ is selected if the opcode indicates multiplication. In final processing, $Y_{out}$ is composed from $Y_{exp}$ and $Y_{man}$.

This apparatus can be implemented utilizing many different technologies. These technologies include field programmable gate arrays, application specific integrated circuits, portions of integrated circuits, programmable read only memory, programmable logic arrays, hard-wired electrical circuits, or the like.

It will be understood that many additional changes in the details, materials, steps, and arrangement of parts, which have been herein described and illustrated in order to explain the nature of the invention, may be made by those skilled in the art within the principle and scope of the invention as expressed in the appended claims.

The foregoing description of the preferred embodiments of the invention has been presented for purposes of illustration and description only. It is not intended to be exhaustive, nor to limit the invention to the precise form disclosed, and obviously, many modification and variations are possible in light of the above teaching. Such modifications and variations that may be apparent to a person skilled in the art are intended to be included within the scope of this invention as defined by the accompanying claims.

What is claimed is:

1. An apparatus for computing a multiplication, an addition or a subtraction of two operands A and B in floating point format having mantissas and exponents to give one of a multiplication, an addition or a subtraction result selected by a user supplied opcode comprising:
   a mantissa multiplier joined to receive the mantissas of A and B and to provide a product of the mantissas;
   an multiplication exponent adder joined to receive the exponents of A and B and to calculate a multiplication preliminary result exponent as a sum of the exponents, said multiplication exponent adder storing at least one additional exponent bit more than the maximum number of exponent bits for the floating point format;
   an XOR gate joined to receive the signs of A and B and to calculate an output sign as the exclusive OR of the signs of A and B to provide a multiplication output sign;
   a priority encoder joined to receive the product of the mantissas and to provide the order of the product;
   shift logic joined to receive the order of the product and to provide a number of shifts required for an output mantissa in the floating point format;
   a mantissa shift register joined to receive the product of the mantissas and the number of shifts, the mantissa shift register shifting the product of the mantissas by dropping the least significant digits of the product in order to fit the product of the mantissas into the places available for the output mantissa in the floating point format and to provide the shifted product of the mantissas as the mantissa of the multiplication result;
   a combiner is joined to receive the mantissa of the multiplication result and the multiplication output sign and to provide a signed multiplication result;
   an addition/subtraction comparator joined to receive the exponents of A and B and to calculate the greater exponent to provide an addition/subtraction preliminary result exponent, said addition/subtraction comparator storing at least one additional exponent bit more than the maximum number of exponent bits for the floating point format as the addition/subtraction preliminary result exponent;
   an addition/subtraction exponent subtractor joined to receive the exponents of A and B and capable of providing a scale difference between A and B;
   a register receiving the mantissas of A and B and the scale difference, said register further aligning the mantissas of A and B in accordance with the scale difference and providing the aligned mantissas of A and B;
   an adder/subtractor of receiving the aligned mantissas of A and B, providing a signed A and B mantissa addition result, and providing a signed A and B mantissa subtraction result;
   an exponent multiplexer is joined to receive the user supplied opcode, the multiplication preliminary result exponent and the addition/subtraction preliminary result exponent and to provide a result exponent based on the user supplied opcode, said exponent multiplexer providing the multiplication preliminary result exponent as the result exponent if the user supplied opcode selects multiplication, and said exponent multiplexer providing the addition/subtraction preliminary result exponent as the result exponent if the user supplied opcode selects addition or subtraction;
   an error detector joined to receive the result exponent and to provide an error condition indicator, said error detector providing an error condition indicator if either one or both of the two most significant bits of the result exponent is asserted, and the result exponent being the result exponent when neither of the two most significant bits of the result exponent is asserted;
   a mantissa multiplexer is joined to receive the user supplied opcode, the signed multiplication result, the signed addition result, and the signed subtraction result and provides the result mantissa based on the user supplied opcode, said mantissa multiplexer providing the signed multiplication result if the user supplied opcode selects multiplication, said mantissa multiplexer providing the signed addition result if the user supplied opcode selects addition, and said mantissa multiplexer providing the signed subtraction result exponent if the user supplied opcode selects subtraction; and wherein the result exponent, result mantissa and the error condition indicator are provided as output.

2. The apparatus of claim 1 wherein said adder/subtractor calculates the two's complement of each mantissa, utilizing the two's complement of each mantissa to calculate a two's complement A and B addition result, and utilizing the two's complement of each mantissa to calculate a two's complement A and B subtraction result, converting the two's complement results back into standard form.

3. The apparatus of claim 1 further comprising combination logic receiving the result exponent, result mantissa and the error condition indicator as input and providing the result as output in floating point format.

4. The apparatus of claim 1 wherein said register truncates the least significant digits of the smaller operand if required to fit within the precision of the register.

* * * * *